United States Patent
Ryu et al.

(10) Patent No.: US 9,609,463 B2
(45) Date of Patent: Mar. 28, 2017

(54) STRUCTURE OF MOBILE TERMINAL OPERATING IN A MOBILE COMMUNICATION SYSTEM SUPPORTING DEVICE TO DEVICE COMMUNICATION AND OPERATION METHOD THEREFOR

(71) Applicant: Samsung Electronics Co., Ltd., Suwon-si, Gyeonggi-do (KR)

(72) Inventors: Hyun-Seok Ryu, Yongin-si (KR); Young-Bin Chang, Anyang-si (KR); Chi-Woo Lim, Suwon-si (KR); Kyung-Kyu Kim, Suwon-si (KR); Dae-Gyun Kim, Seongnam-si (KR); Seung-Hoon Park, Seoul (KR); Sang-Kyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 14/268,694

(22) Filed: May 2, 2014

(65) Prior Publication Data

US 2014/0328267 A1    Nov. 6, 2014

(51) Int. Cl.
  *H04W 8/00*   (2009.01)
  *H04W 4/00*   (2009.01)
  *H04B 1/403*  (2015.01)
  *H04W 92/18*  (2009.01)

(52) U.S. Cl.
  CPC ............ *H04W 4/005* (2013.01); *H04B 1/406* (2013.01); *H04W 8/005* (2013.01); *H04W 92/18* (2013.01)

(58) Field of Classification Search
  CPC ... H04W 4/005; H04W 72/042; H04W 8/005; H04W 92/18; H04W 72/0453
  See application file for complete search history.

(56) References Cited

U.S. PATENT DOCUMENTS

2007/0147334 A1*  6/2007  Guthrie ................... H04W 4/08
                                                     370/349
2008/0069033 A1*  3/2008  Li ........................ H04W 48/16
                                                     370/328
2009/0010185 A1   1/2009  Li et al.
                          (Continued)

FOREIGN PATENT DOCUMENTS

EP            2 171 881 B1    9/2012

*Primary Examiner* — Andrew Lai
*Assistant Examiner* — Chuong M Nguyen
(74) *Attorney, Agent, or Firm* — Jefferson IP Law, LLP

(57) ABSTRACT

A mobile terminal in a mobile communication system supporting device to device (D2D) communication, and a method for operating the mobile terminal are provided. The terminal includes a first radio frequency (RF) chain configured to transmit a mobile communication signal and a second RF chain configured to receive a mobile communication signal, for mobile communication with a base station, a switching unit including a plurality of switches configured to establish transmission and reception paths in the first and second RF chains, and a controller configured to control switching of the switching unit to establish transmission and reception paths of a D2D communication signal for D2D communication by combining a part of the first RF chain with a part of the second RF chain. The combination of the parts of the first and second RF chains is different according to a D2D communication frequency band.

7 Claims, 12 Drawing Sheets

(56) References Cited

U.S. PATENT DOCUMENTS

| | | |
|---|---|---|
| 2009/0016225 A1 | 1/2009 | Laroia et al. |
| 2010/0142416 A1* | 6/2010 | Kim .................. H04B 7/15557 |
| | | 370/281 |
| 2011/0170463 A1* | 7/2011 | Aryan ..................... G01S 13/74 |
| | | 370/281 |
| 2012/0185605 A1 | 7/2012 | Patil et al. |
| 2013/0230026 A1* | 9/2013 | Kwon ................. H04W 76/023 |
| | | 370/336 |

* cited by examiner

STRUCTURE OF MOBILE TERMINAL OPERATING IN A MOBILE COMMUNICATION SYSTEM SUPPORTING DEVICE TO DEVICE COMMUNICATION AND OPERATION METHOD THEREFOR

CROSS-REFERENCE TO RELATED APPLICATION(S)

This application claims the benefit under 35 U.S.C. §119 (a) of a Korean patent application filed on May 6, 2013 in the Korean Intellectual Property Office and assigned Serial number 10-2013-0050763, the entire disclosure of which is hereby incorporated by reference.

TECHNICAL FIELD

The present disclosure relates to a structure of a mobile terminal operating in a mobile communication system supporting Device to Device (D2D) communication and an operation method therefor.

BACKGROUND

Mobile communication systems have been developed into high-speed, high-quality wireless packet data communication systems that provide a data service and a multimedia service in addition to the traditional voice-oriented service. To support high-speed, high-quality wireless packet data communication services, Code Division Multiple Access (CDMA) networks that provide $2^{nd}$ Generation (2G) mobile communication have evolved into various mobile communication systems including High Speed Downlink Packet Access (HSDPA), High Speed Uplink Packet Access (HSUPA), Long Term Evolution (LTE), and LTE-Advanced (LTE-A) of the $3^{rd}$ Generation partnership project (3GPP), and High Rate Packet Data (HRPD) of the 3GPP2.

Due to a rapid increase in the number of wireless communication users and increasing demands for large wireless communication capacities, legacy mobile communication systems, for example, the LTE communication system has limitations in accommodating increasing data traffic. In this context, direct communication between mobile terminals or User Equipments (UEs) (hereinafter, referred to as Device to Device (D2D) communication) without the intervention of an Evolved Node B (eNode B or eNB) has been introduced. Since direct communication is enabled between adjacent UEs by D2D communication, the UEs take over data transmission and reception control from an eNB, thus distributing the communication load of the eNB. Further, as adjacent UEs communicate with each other by D2D communication, the UEs may communicate faster on a better-quality channel than a channel between an eNB and a UE.

For the convenience in description, ● denotes a UE that supports both of D2D communication and mobile communication (hereinafter, referred to as a 'D2D UE' or a 'dual mode UE') and ○ denotes a UE that supports only mobile communication (hereinafter, referred to as a 'mobile UE' or a 'cellular UE') in FIGS. 1A, 1B, 2A, and 2B. In the present disclosure, the 'mobile communication' may mean at least one of cellular communication (e.g., LTE communication, LTE-A communication, HSDPA communication, global system for mobile communication (GSM) communication, and wideband code division multiple access (W-CDMA) communication, etc.). In the present disclosure, the 'D2D communication' may mean at least one of WiFi communication, Bluetooth communication, and ZigBee communication, etc.

FIG. 1A illustrates an example of DownLink (DL) communication in a mobile communication system supporting D2D communication according to the related art.

Referring to FIG. 1A, UEs within the cell coverage of an eNB 110 may conduct D2D communication and mobile communication. Then the eNB 110 may transmit DL data for mobile communication on a DL channel to any of D2D UEs and mobile UEs.

FIG. 1B illustrates an example of UpLink (UL) communication in a mobile communication system supporting D2D communication according to the related art.

Referring to FIG. 1B, an eNB 120 may receive UL data for mobile communication from any of D2D UEs and mobile UEs.

FIG. 2A illustrates an example of D2D communication during DL communication in a mobile communication system supporting D2D communication according to the related art.

Referring to FIG. 2A, while an eNB 210 is conducting DL communication with a mobile UE, a D2D UE 211 may directly communicate with another D2D UE by D2D communication. It is assumed herein that the D2D UE 211 has requested D2D communication to the eNB 210 and the eNB 210 has accepted the D2D communication request.

FIG. 2B illustrates an example of D2D communication during UL communication in a mobile communication system supporting D2D communication according to the related art.

Referring to FIG. 2B, while an eNB 220 is conducting UL communication with a mobile UE, a D2D UE 221 may directly communicate with another D2D UE by D2D communication. It is assumed herein that the D2D UE 221 has requested D2D communication to the eNB 220 and the eNB 220 has accepted the D2D communication request.

To conduct D2D communication as well as mobile communication with an eNB in the mobile communication system as illustrated in FIGS. 2A and 2B, a D2D UE includes a transceiver for distinguishing the communication schemes, that is, mobile communication and D2D communication from each other. The transceiver includes duplexers for inputting and outputting signals by distinguishing mobile communication from D2D communication and a plurality of Radio Frequency (RF) chains mapped to the respective duplexers, for processing transmission and reception signals.

In general, an RF chain includes amplifiers, mixers, and converters. The amplifiers include a Power Amplifier (PA) that amplifies the strength of a signal and a Low Noise Amplifier (LNA) for amplifying a signal by reducing noise. The mixers include an up mixer for upconverting a baseband signal into an RF signal and a down mixer for downconverting an RF signal into a baseband signal. The converters include a Digital to Analog Converter (DAC) for converting a digital signal into an analog signal and an Analog to Digital Converter (ADC) for converting an analog signal into a digital signal.

In general, a duplexer includes an antenna and two band pass filters for filtering a signal received through the antenna and filtering a transmission signal from a signal amplified by an amplifier.

FIG. 3 is a block diagram of a UE operating in a mobile communication system supporting D2D communication according to the related art.

Referring to FIG. 3, a UE 300 operates, for example, in Frequency Division Duplexing (FDD) and includes first and second duplexers 310 and 340 for respective communication schemes, a plurality of antennas 311 and 341, a plurality of RF chains, and a controller 370. Each of the plurality of RF chains includes a Transmission (Tx) chain for processing a signal to be transmitted to a wireless network and a Reception (Rx) chain for processing a signal received from the wireless network, in a communication scheme corresponding to the RF chain.

The UE 300 includes the first duplexer 310 for mobile communication and the second duplexer 340 for D2D communication. The first duplexer 310 includes two duplexers, one of which is connected to a first Tx chain 320 for processing a signal to be transmitted to an eNB and the other of which is connected to a first Rx chain 330 for processing a signal received from the eNB.

Likewise, the second duplexer 340 includes two duplexers, one of which is connected to a second Tx chain 350 for processing a D2D communication signal to be transmitted to a D2D UE and the other of which is connected to a second Rx chain 360 for processing a D2D communication signal received from the D2D UE.

Each of the first and second Tx chains 320 and 350 includes an amplifier 321 or 351, a mixer 322 or 352, and a Digital-to-Analog Converter (DAC) 323 or 353. Likewise, each of the first and second Rx chains 330 and 360 includes an amplifier 331 or 361, a mixer 332 or 362, and an Analog-to-Digital Converter (ADC) 333 or 363.

The controller 370 conducts mobile communication by controlling the first Tx and Rx chains 320 and 330 and D2D communication by controlling the second Tx and Rx chains 350 and 360. Detailed operations of each Tx chain and each Rx chain are known and will not be described herein.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a UE operating in a mobile communication system supporting Device to Device (D2D) communication includes at least four Radio Frequency (RF) chains to transmit and receive signals for mobile communication and D2D communication. As a result, the UE further includes redundant devices according to the number of RF chains, thereby increasing implementation complexity and cost.

Accordingly, an aspect of the present disclosure is to provide a structure of a mobile terminal operating in a mobile communication system supporting D2D communication and an operation method therefor.

In accordance with an aspect of the present disclosure, a mobile terminal in a mobile communication system supporting D2D communication is provided. The mobile terminal includes a first RF chain configured to transmit a mobile communication signal and a second RF chain configured to receive a mobile communication signal, for mobile communication with a base station, a switching unit including a plurality of switches configured to establish transmission and reception paths in the first and second RF chains, and a controller configured to control switching of the switching unit to establish transmission and reception paths of a D2D communication signal for D2D communication by combining a part of the first RF chain with a part of the second RF chain. The combination of the parts of the first and second RF chains is different according to a D2D communication frequency band allocated in a part of frequency bands for mobile communication.

In accordance with another aspect of the present disclosure, a D2D communication method of a mobile terminal in a mobile communication system supporting D2D communication is provided. The method includes detecting a generation of a D2D communication signal for D2D communication, and controlling an establishment of transmission and reception paths of the D2D communication signal through at least one of a first RF chain for transmitting a mobile communication signal for mobile communication with a base station, a second RF chain for receiving a mobile communication signal, and a combined chain obtained by combining a part of the first RF chain with a part of the second RF chain.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used herein to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure provides an improved structure of a User Equipment (UE) operating in a mobile communication system supporting Device to Device (D2D) communication and a method for operating the UE in order to reduce implementation complexity and cost.

Figure 4:
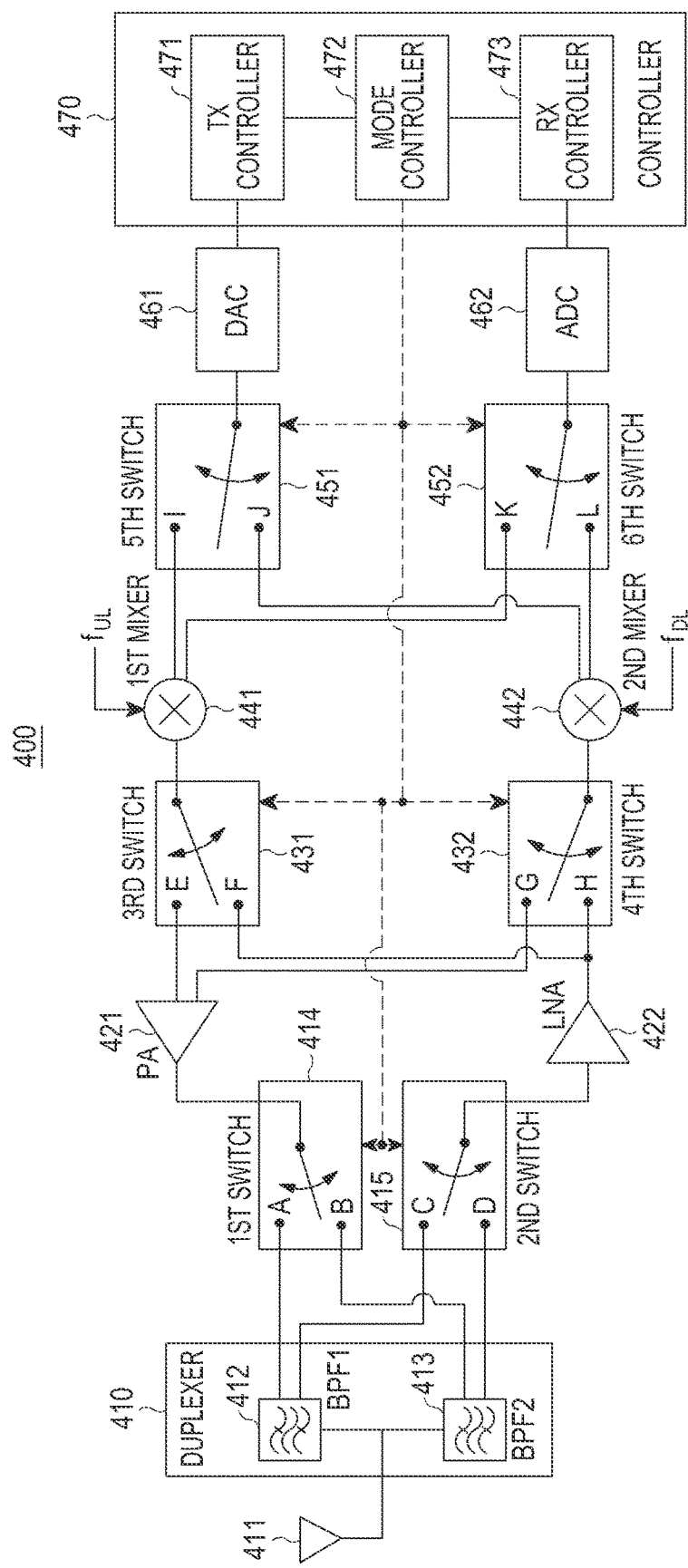
FIG. 4 is an example of a block diagram of a UE according to an embodiment of the present disclosure.

FIG. 4 is a block diagram of a UE according to an embodiment of the present disclosure.

Referring to FIG. 4, a UE 400 includes a duplexer 410, an antenna 411, amplifiers 421 and 422, mixers 441 and 442, converters 461 and 462, and a plurality of switches 414, 415, 431, 432, 451, and 452. For example, the UE 400 includes one Transmission (Tx) chain and one Reception (Rx) chain. The Tx chain includes the duplexer 410, the Power Amplifier (PA) 421, the first mixer 441, the Digital-to-Analog Converter (DAC) 461, and the first, third, and fifth switches 414, 431, and 451. The Rx chain includes the duplexer 410, the Low Noise Amplifier (LNA) 422, the second mixer 442, the Analog-to-Digital Converter (ADC) 462, and the second, fourth, and sixth switches 415, 432, and 452. Each of the plurality of switches 414, 415, 431, 432, 451, and 452 collectively form a switching unit that switches the Tx or Rx path of a signal in the Tx or Rx chain.

The controller 470 provides overall control to the UE 400. Specifically, as the UE 400 transmits and receives signals to and from a mobile communication eNB by mobile communication or transmits and receives D2D communication signals to and from another UE by D2D communication, the controller 470 switches the signal path of the Tx/Rx signal for each communication scheme by controlling the switching unit. Specifically, the controller 470 includes a Tx controller 471 for controlling a Tx operation of the Tx chain, an Rx controller 473 for controlling an Rx operation of the Rx chain, and a mode controller 472 for determining one of mobile communication and D2D communication to be a current communication scheme and controlling a signal path by controlling the switching unit according to the determined communication scheme.

For D2D communication, the mode controller 472 establishes a signal path corresponding to D2D communication by controlling the switching unit, so that D2D communication may be conducted in a frame having a frame structure corresponding to a D2D communication scheme supported by the mobile communication system. The UE 400 may identify the frame based on the D2D communication scheme by system information, by signaling from an eNB, or in a predetermined method.

Frame structures corresponding to D2D communication schemes will be described, with reference to FIGS. 5A, 5B, and 5C. Specifically, the present disclosure provides a structure of a UE for switching a signal path according to a frame structure corresponding to a specific D2D communication scheme and a method for controlling a signal path.

Referring to FIG. 4, the duplexer 410 is connected to the first switch 414 for establishing paths between the PA 421 and the BPFs 412 and 413 and the second switch 415 for establishing paths between the LNA 422 and the BPFs 412 and 413.

The UE 400 includes the third and fourth switches 431 and 432 for establishing signal paths between the amplifiers 421 and 422 and the mixers 441 and 442 and the fifth and sixth switches 451 and 452 for establishing signal paths between the mixers 441 and 442 and the converters 461 and 462.

Specifically, the first switch 414 switches a signal output from the PA 421 to the duplexer 410, and the second switch 415 switches a signal output from the duplexer 410 to the LNA 422. The first or second switch 414 or 415 may be disposed outside the duplexer 410 as illustrated in FIG. 4 or inside the duplexer 410, when needed. The third switch 431 switches a signal output from the first mixer 441 to the PA 421 or the signal output from the LNA 422 to the first mixer 441. The fourth switch 432 switches a signal output from the second mixer 442 to the PA 421 or a signal output from the LNA 422 to the second mixer 442.

The fifth switch 451 switches a signal output from the DAC 461 to the first mixer 441 or a signal output from the DAC 461 to the second mixer 442. The sixth switch 452 switches a signal output from the second mixer 442 to the ADC 462 or a signal output from the first mixer 441 to the ADC 462. The first mixer 441 outputs an RF signal by multiplying a baseband signal received from the DAC 461 by a first local oscillation signal $f_{UL}$ (that is, in a signal path illustrated in FIG. 6) or outputs a baseband signal by multiplying an RF signal received from the LNA 422 by the first local oscillation signal $f_{UL}$ (that is, in a signal path illustrated in FIG. 8). The second mixer 442 outputs a baseband signal by multiplying an RF signal received from the LNA 422 by a second local oscillation signal $f_{DL}$ (that is, in a signal path illustrated in FIG. 9) or outputs an RF signal by multiplying a baseband signal received from the DAC 461 by the second local oscillation signal $f_{DL}$ (that is, in a signal path illustrated in FIG. 7).

Figure 1A:
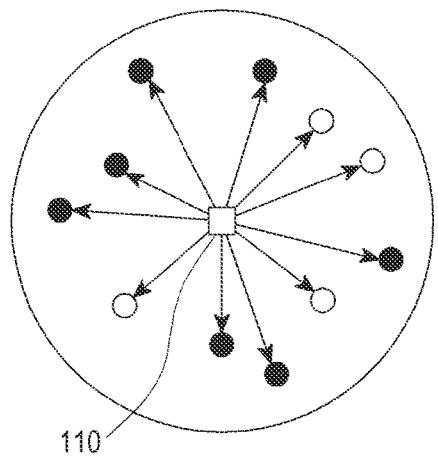
FIG. 1A illustrates an example of Downlink (DL) communication in a mobile communication system supporting Device to Device (D2D) communication according to the related art.
Figure 1B:
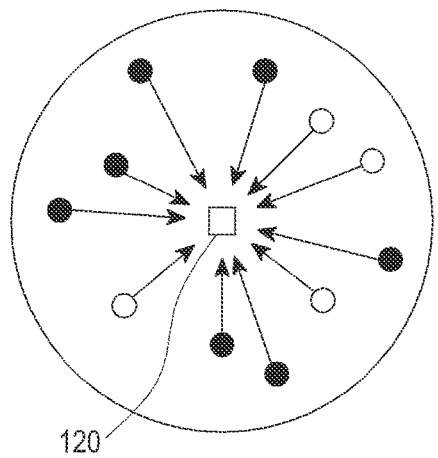
FIG. 1B illustrates an example of Uplink (UL) communication in a mobile communication system supporting D2D communication according to the related art.
Figure 2A:
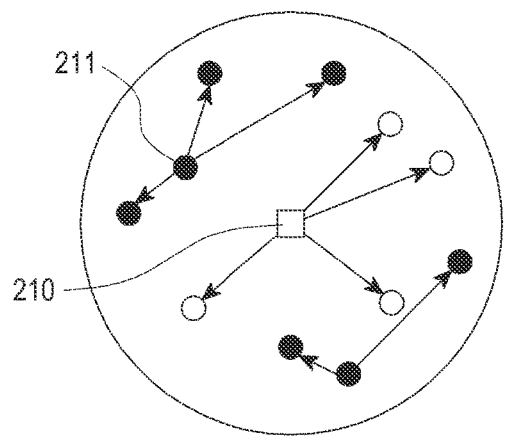
FIG. 2A illustrates an example of D2D communication during DL communication in a mobile communication system supporting D2D communication according to the related art.
Figure 2B:
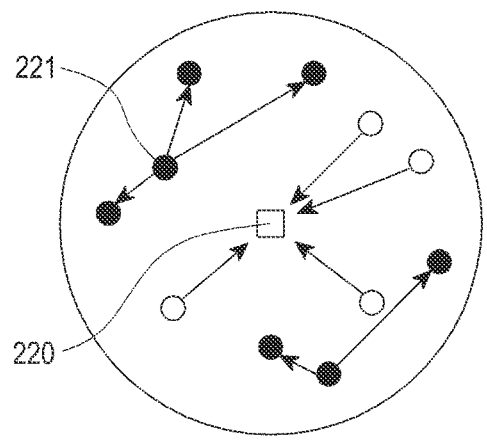
FIG. 2B illustrates an example of D2D communication during UL communication in a mobile communication system supporting D2D communication according to the related art.
Figure 3:
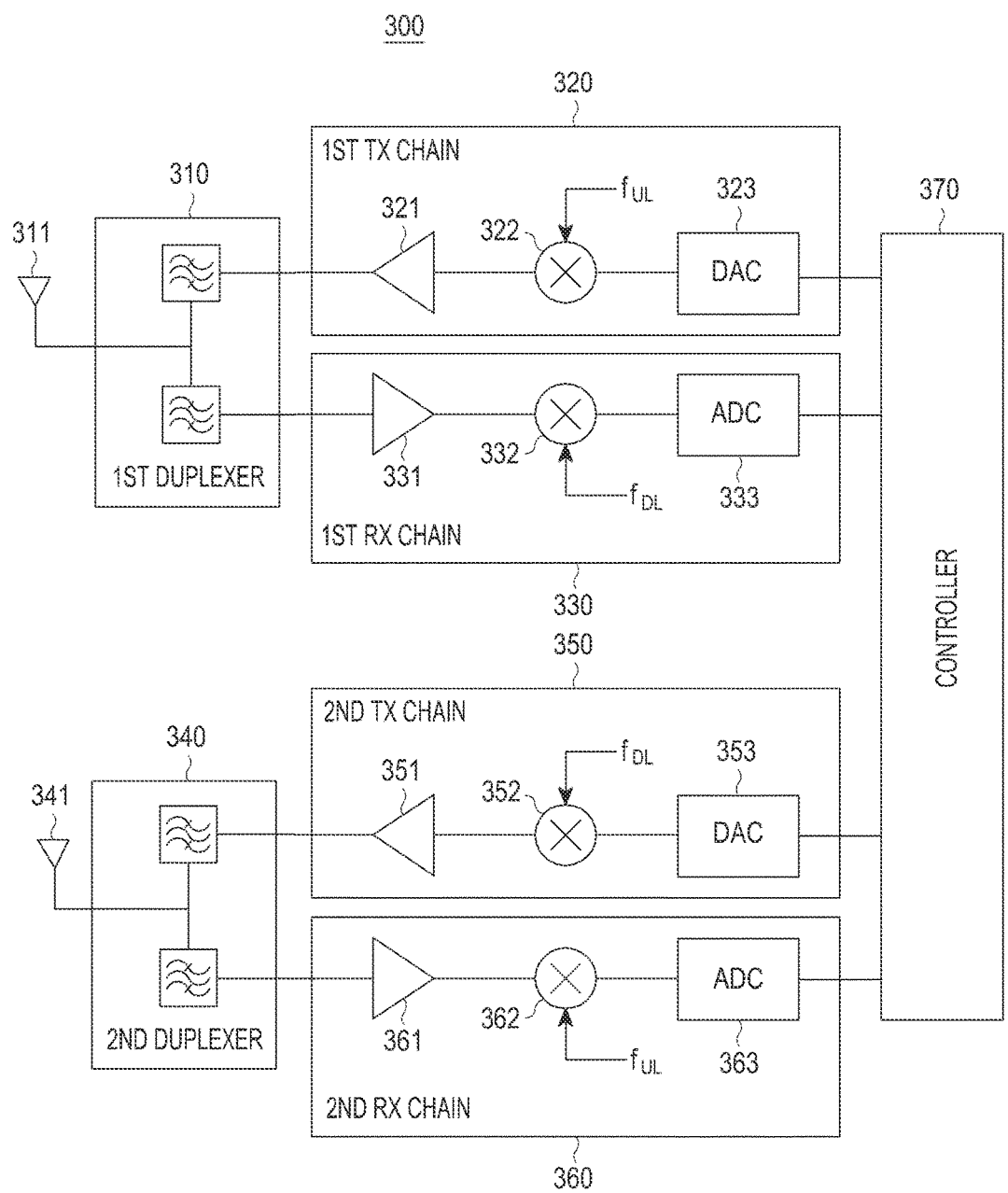
FIG. 3 is an example of a block diagram of a User Equipment (UE) in a mobile communication system supporting D2D communication according to the related art.

In the embodiment of the present disclosure, the UE 400 illustrated in FIG. 4 is configured so as to include one Tx chain and one Rx chain. Compared to the UE configuration according to the related art illustrated in FIG. 3, the number of RF chains including Tx and Rx chains is reduced by 1. As a consequence, the UE 400 has less transceiver complexity than the UE of the related art. In general, resources may be allocated in such a manner that different frequency bands are used for D2D communication and mobile communication or the same frequency band is shared between D2D communication and mobile communication. The latter case includes an underlaying scheme or an overlaying scheme.

Various embodiments of the present disclosure provide frame structures corresponding to resource allocation schemes in which the same frequency band is allocated for D2D communication and mobile communication. The frame structures illustrated in FIGS. 5A, 5B, and 5C are used, for example, for a Frequency Division Duplexing (FDD) system. Each frame structure includes a DL frequency band $f_{DL}$ 51 and a UL frequency band $f_{UL}$ 52, which are pre-allocated for mobile communication. A mobile UE receives data and control information from an eNB in the DL frequency band $f_{DL}$ 51 and transmits data and control information to the eNB in the UL frequency band $f_{UL}$ 52. A frequency band for D2D communication is allocated in a frequency band for mobile communication, $f_{DL}$ 51 or $f_{UL}$ 52. For example, it is assumed that one radio frame is divided into 10 subframes in total in FIGS. 5A, 5B, and 5C. It is also assumed that a D2D UE has the device configuration illustrated in FIG. 4. In FIGS. 5A, 5B, and 5C, for the convenience of description, a subframe in which a mobile UE transmits a mobile communication signal to an eNB is denoted by 'TX' and a subframe in which a mobile UE receives a mobile communication signal from an eNB is denoted by 'RX', whereas a subframe in which a specific D2D UE transmits a D2D communication signal to another D2D UE is denoted by 'tx' and a subframe in which a specific D2D UE receives a D2D communication signal from another D2D UE is denoted by 'rx'.

In the underlaying scheme, being one of the resource allocation schemes in which the same frequency band is shared between mobile communication and D2D communication, one of the frequency bands $f_{DL}$ 51 or $f_{UL}$ 52 allocated for mobile communication may be shared for D2D communication in an embodiment of the present disclosure. Specifically, a resource allocation scheme of sharing the UL frequency band $f_{UL}$ 52 between mobile communication and D2D communication (hereinafter, referred to as an 'underlaying UL scheme') and a resource allocation scheme of sharing the DL frequency band $f_{DL}$ 51 between mobile communication and D2D communication (hereinafter, referred to as an 'underlaying DL scheme') are applicable to frame structures according to various embodiments of the present disclosure.

Figure 5A:
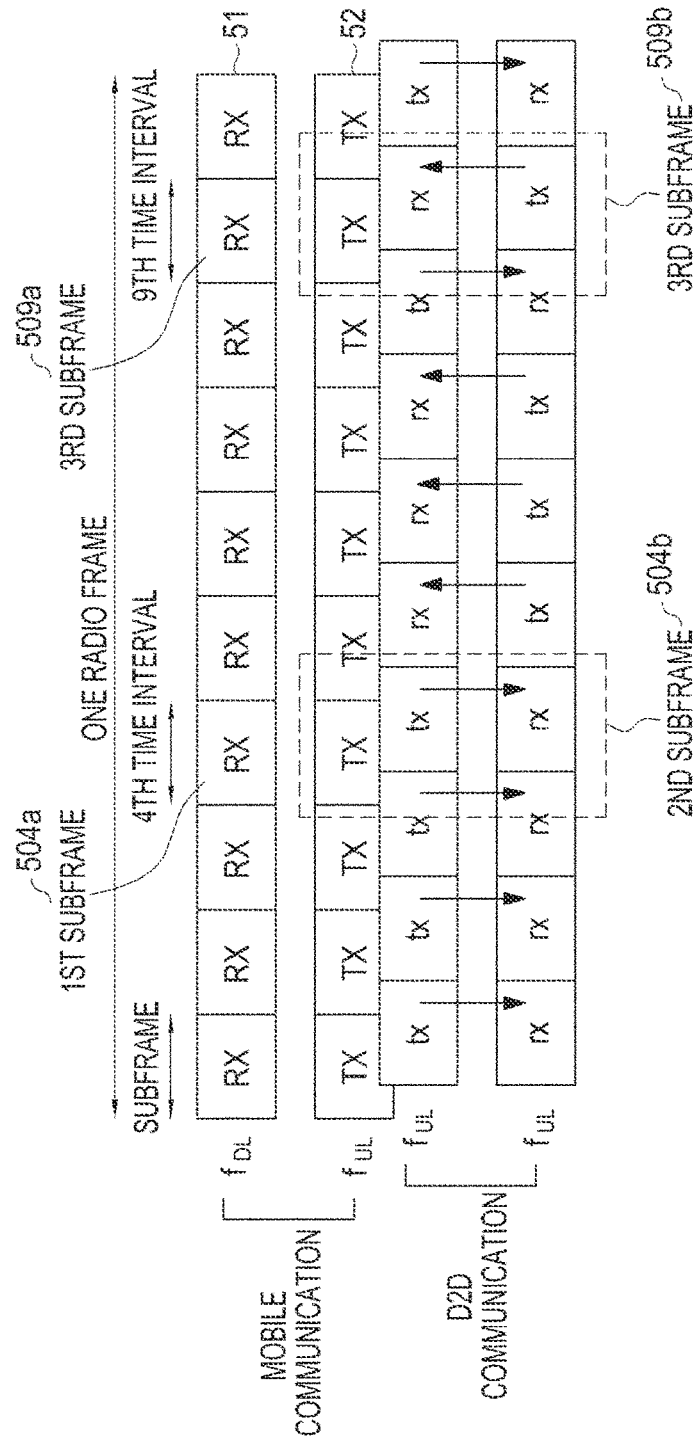
FIG. 5A illustrates an example of a frame structure for an underlaying UL scheme according to an embodiment of the present disclosure.

FIG. 5A illustrates a frame structure for an underlaying UL scheme according to an embodiment of the present disclosure.

Referring to FIG. 5A, resources at the same position in the UL frequency band $f_{UL}$ 52 are allocated to both a mobile UE and a D2D UE in an overlapped manner in the underlaying UL scheme. That is, the mobile UE and the D2D UE conduct mobile communication and D2D communication respectively in the same time-frequency resources of the same subframe in the UL frequency band $f_{UL}$ 52. For example, it is assumed that resources for D2D communication have been allocated to be overlapped with resources for mobile communication in the UL frequency band $f_{UL}$ 52 in FIG. 5A. For example, a mobile communication signal is received (RX) in a first subframe 504a corresponding to a fourth time interval in the DL frequency band $f_{DL}$ 51. At the same time, a D2D communication signal may be Transmitted (tx) or Received (rx) as well as a mobile communication signal may be Transmitted (TX) in a second subframe 504b corresponding to the fourth time interval in the UL frequency band $f_{UL}$ 52. In another example, a mobile communication signal is Received (RX) in a third subframe 509a corresponding to a ninth time interval in the DL frequency band $f_{DL}$ 51. At the same time, a D2D communication signal may be rx or tx as well as a mobile communication signal may be TX in a fourth subframe 509b corresponding to the ninth time interval in the UL frequency band $f_{UL}$ 52.

Figure 5B:
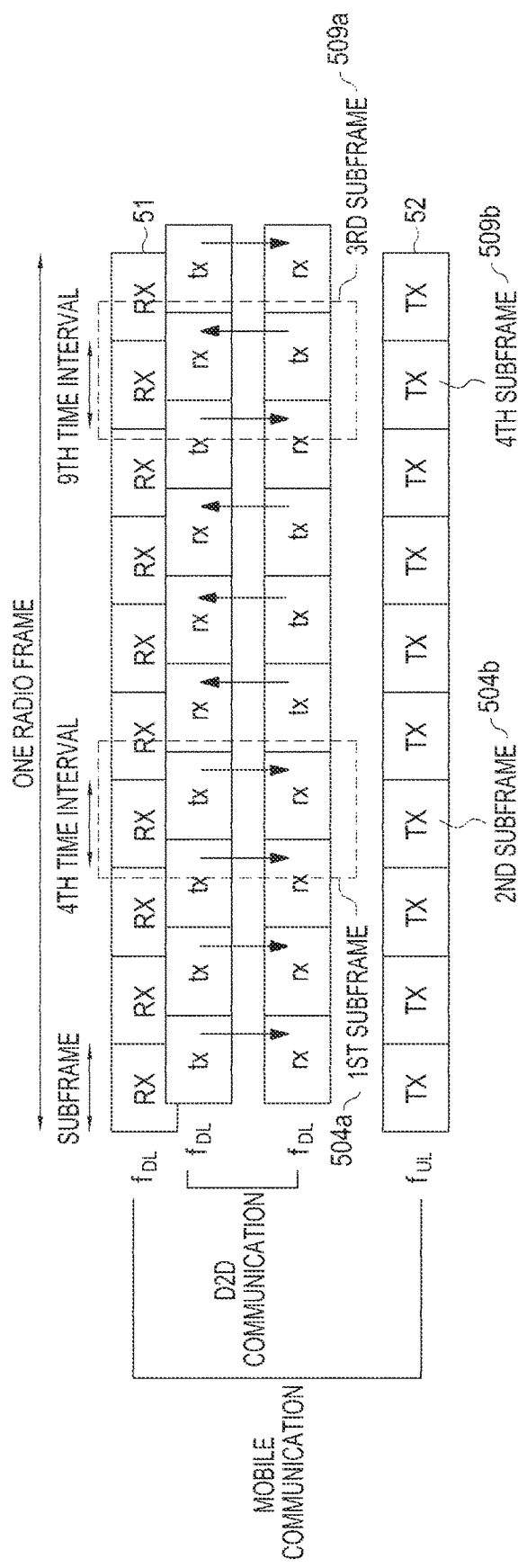
FIG. 5B illustrates an example of a frame structure for an underlaying DL scheme according to an embodiment of the present disclosure.

FIG. 5B illustrates a frame structure for an underlaying DL scheme according to an embodiment of the present disclosure.

Referring to FIG. 5B, resources at the same position in the DL frequency band $f_{DL}$ 51 are allocated to both a mobile UE and a D2D UE in an overlapped manner in the underlaying DL scheme. That is, the mobile UE and the D2D UE conduct mobile communication and D2D communication respectively in the same time-frequency resources of the same subframe in the DL frequency band $f_{DL}$ 51. For example, it is assumed that resources for D2D communication has been allocated to be overlapped with resources for mobile communication in the DL frequency band $f_{DL}$ 51 in FIG. 5B. For example, a mobile communication signal is TX in the second subframe 504b corresponding to the fourth time interval in the UL frequency band $f_{UL}$ 52. At the same time, a D2D communication signal may be tx or rx as well as a mobile communication signal may be RX in the first subframe 504a corresponding to the fourth time interval in the DL frequency band $f_{DL}$ 51. In another example, a mobile communication signal is TX in the fourth subframe 509b corresponding to the ninth time interval in the UL frequency band $f_{UL}$ 52. At the same time, a D2D communication signal may be rx or tx as well as a mobile communication signal may be RX in the third subframe 509a corresponding to the ninth time interval in the DL frequency band $f_{DL}$ 51.

In the overlaying scheme, being another resource allocation scheme of using the same frequency band for mobile communication and D2D communication, a resource area is not shared between mobile communication and D2D communication. Therefore, resources of the same frequency are allocated independently for D2D communication.

Figure 5C:
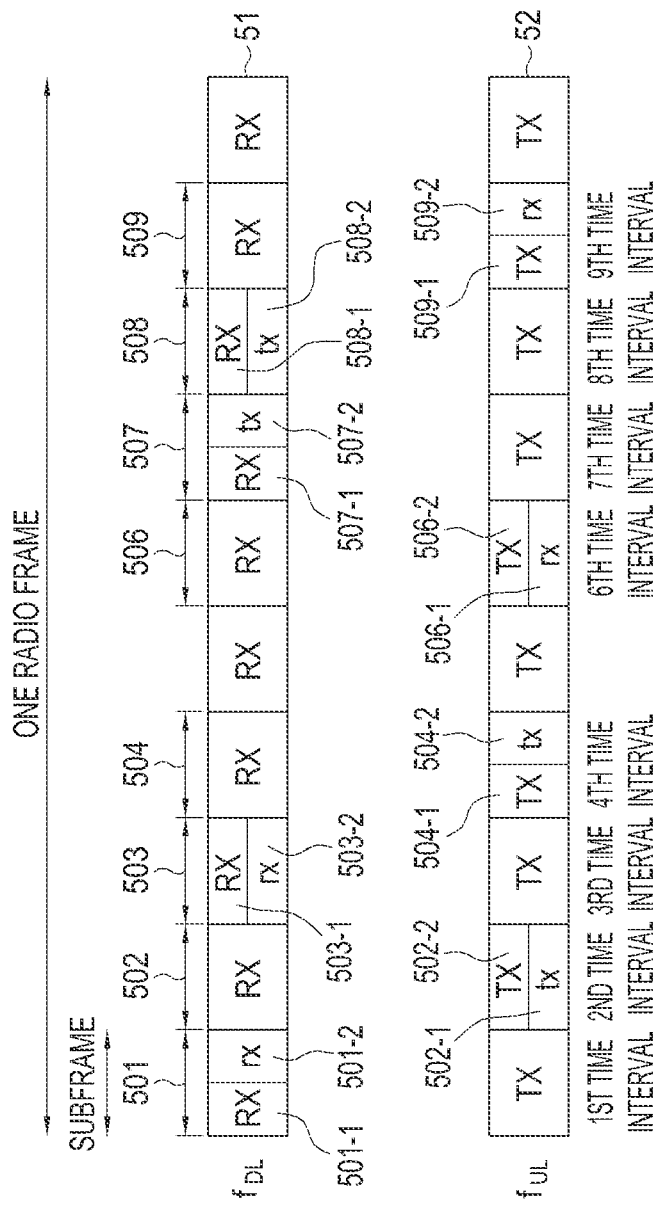
FIG. 5C illustrates an example of a frame structure for an overlaying scheme according to an embodiment of the present disclosure.

FIG. 5C illustrates a frame structure for an overlaying scheme according to an embodiment of the present disclosure.

Referring to FIG. 5C, in the overlaying scheme for D2D communication, time-resources at a different position from time-resources used for a mobile UE are orthogonally allocated to a D2D UE. The orthogonal resource allocation may be performed in both the DL frequency band $f_{DL}$ 51 and the UL frequency band $f_{UL}$ 52. That is, a mobile UE and a D2D UE may use different subframes of the same frequency band orthogonally in time division, or use the same subframe orthogonally in frequency division. It is first assumed that resources of the DL frequency band $f_{DL}$ 51 are allocated for D2D communication orthogonally in time division. In this case, for example, a subframe corresponding to a first time interval 501 in the DL frequency band $f_{DL}$ 51 may include a first subframe 501-1 in which a mobile communication signal is RX and a second subframe 501-2 in which a D2D communication signal is rx. In another example, a subframe corresponding to a seventh time interval 507 in the DL frequency band $f_{DL}$ 51 may include a first subframe 507-1 in which a mobile communication signal is RX and a second subframe 507-2 in which a D2D communication signal is tx.

If resources of the DL frequency band $f_{DL}$ 51 are allocated for D2D communication orthogonally in frequency division, for example, a subframe corresponding to a third time interval 503 in the DL frequency band $f_{DL}$ 51 may include a first subframe 503-1 in which a mobile communication signal is RX and a second subframe 503-2 in which a D2D communication signal is rx. In another example, a subframe corresponding to an eighth time interval 508 in the DL frequency band $f_{DL}$ 51 may include a first subframe 508-1 in which a mobile communication signal is RX and a second subframe 508-2 in which a D2D communication signal is tx.

Now it is assumed that resources of the UL frequency band $f_{UL}$ 52 are allocated for D2D communication orthogonally in time division. In this case, for example, a subframe corresponding to a fourth time interval 504 in the UL frequency band $f_{UL}$ 52 may include a first subframe 504-1 in which a mobile communication signal is TX and a second subframe 504-2 in which a D2D communication signal is tx. In another example, a subframe corresponding to a ninth time interval 509 in the UL frequency band $f_{UL}$ 52 may include a first subframe 509-1 in which a mobile communication signal is TX and a second subframe 509-2 in which a D2D communication signal is rx.

If resources of the UL frequency band $f_{UL}$ 52 are allocated for D2D communication orthogonally in frequency division, for example, a subframe corresponding to a second time interval 502 in the UL frequency band $f_{UL}$ 52 may include a first subframe 502-1 in which a mobile communication signal is TX and a second subframe 502-2 in which a D2D communication signal is tx. In another example, a subframe corresponding to a sixth time interval 506 in the UL frequency band $f_{UL}$ 52 may include a first subframe 506-1 in which a mobile communication signal is TX and a second subframe 506-2 in which a D2D communication signal is rx.

With reference to FIGS. 6, 7, 8, and 9, signal paths of a D2D UE operating based on the frame structures corresponding to the underlaying UL/DL scheme and the overlaying scheme in one of the UL and DL frequency bands of mobile communication according to various embodiments of the present disclosure will be described below. Herein, the Tx and Rx paths of a D2D communication signal will be described with the appreciation that the UE has the configuration illustrated in FIG. 4 to operate based on the frame structures of FIGS. 5A, 5B, and 5C.

Figure 6:
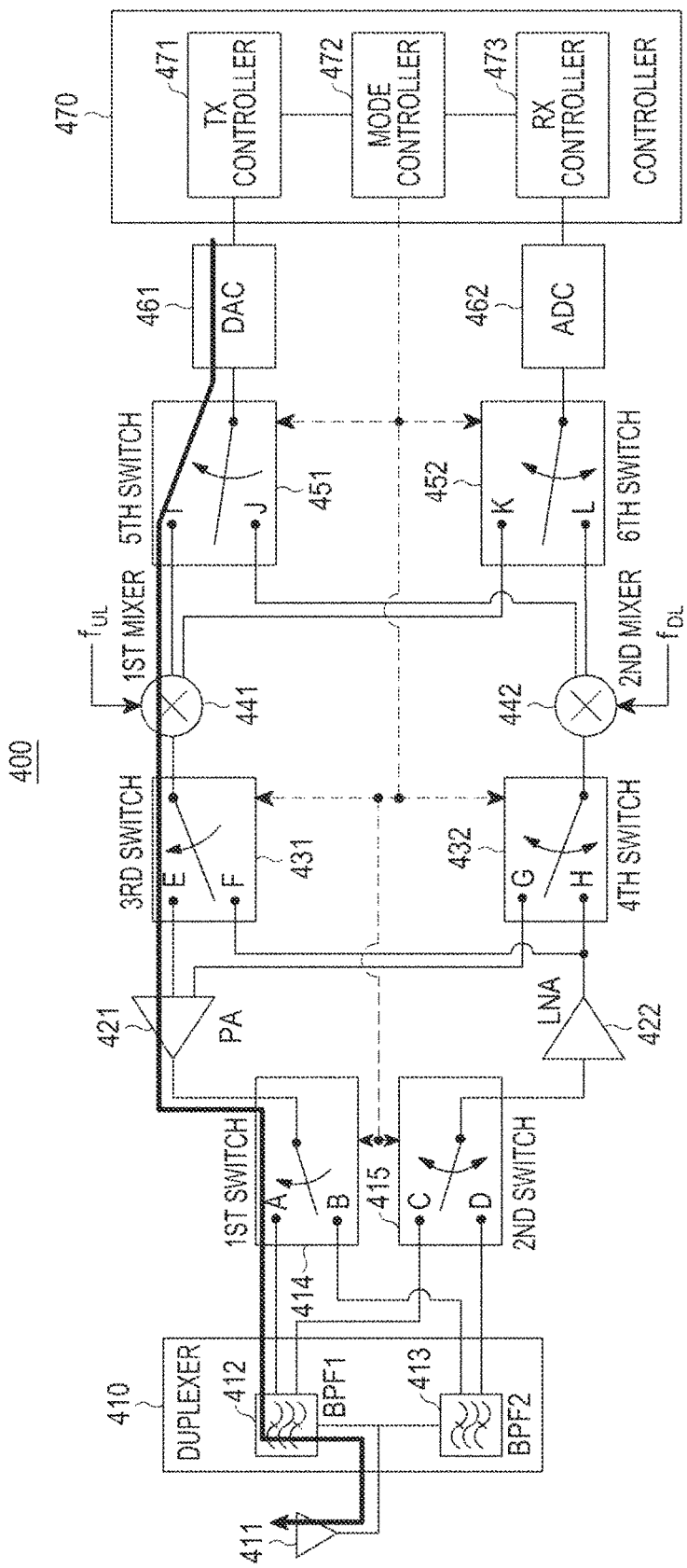
FIG. 6 illustrates an example of a signal path in a case where a UE transmits a D2D communication signal based on the frame structures illustrated in FIGS. 5A, 5B, and 5C according to an embodiment of the present disclosure.

FIG. 6 illustrates a signal path in a case where a UE transmits a D2D communication signal based on the frame structures illustrated in FIGS. 5A, 5B, and 5C according to an embodiment of the present disclosure. In the illustrated case of FIG. 6, resources of a UL frequency band for mobile communication are allocated for D2D communication.

Referring to FIG. 6, upon generation of a D2D communication signal to be transmitted to another D2D UE in the UE 400, the mode controller 472 controls the switching unit so as to establish a Tx path of the D2D communication signal in the UL frequency band for mobile communication overlapped with or orthogonal to a D2D frequency band for D2D communication. Herein, a total frequency band of the mobile communication system is divided into the DL and UL frequency bands for mobile communication.

The first mixer 441 mixes the D2D communication signal with the UL frequency band overlapped with or orthogonal to the D2D frequency area. The second mixer 442 mixes a mobile communication signal with the DL frequency band. Accordingly, the mode controller 472 controls the switching unit so that the D2D communication signal may be transmitted to the antenna 411 in the path where the D2D communication signal is mixed with the UL frequency band overlapped with/orthogonal to the D2D frequency area by the first mixer 441.

Specifically, the mode controller 472 controls switching of an output port of the DAC 461 to an I port of the fifth switch 451. Then the mode controller 472 controls switching of an output port of the first mixer 441 to an E port of the third switch 431 so that a signal output from the first mixer 441 may be connected to an input port of the PA 421. Finally, the mode controller 472 connects an output port of the PA 421 to an A port of the first switch 414 so that the output port of the PA 421 may be connected to an input port of the first BPF 412.

When the UE 400 transmits a UL signal for mobile communication to an eNB, the above Tx path of a D2D communication signal may be established.

Figure 7:
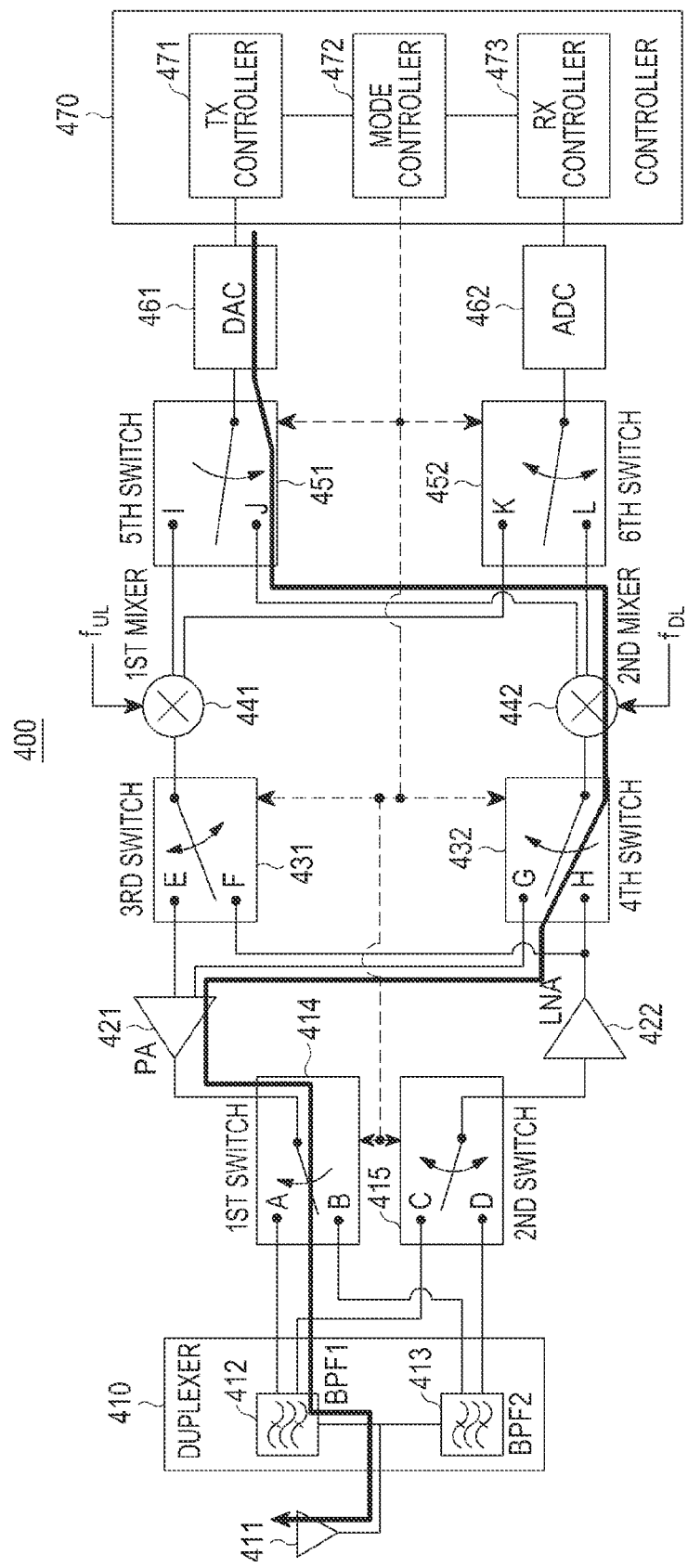
FIG. 7 illustrates an example of a signal path in a case where a UE transmits a D2D communication signal based on the frame structures illustrated in FIGS. 5A, 5B, and 5C according to an embodiment of the present disclosure.

FIG. 7 illustrates a signal path in a case where a UE transmits a D2D communication signal based on the frame structures illustrated in FIGS. 5A, 5B, and 5C according to an embodiment of the present disclosure. In the illustrated case of FIG. 7, resources of a DL frequency band for mobile communication are allocated as a frequency area for D2D communication.

Referring to FIG. 7, upon detecting a generation of a D2D communication signal to be transmitted to another D2D UE in the UE 400, the mode controller 472 controls the switching unit so as to establish a Tx path of the D2D communication signal in the DL frequency band for mobile communication overlapped with/orthogonal to a D2D frequency band for D2D communication.

The second mixer 442 mixes the D2D communication signal with the DL frequency band overlapped with/orthogonal to the D2D frequency area. The first mixer 441 mixes a mobile communication signal with the UL frequency band. Accordingly, the mode controller 472 controls the switching unit so that the D2D communication signal may be transmitted to the antenna 411 in the path where the D2D communication signal is mixed with the DL frequency band overlapped with/orthogonal to the D2D frequency area by the second mixer 442.

Specifically, the mode controller 472 controls switching of the output port of the DAC 461 to a J port of the fifth switch 451 so that a signal output from the DAC 461 may be connected to an input port of the second mixer 442. Then the mode controller 472 controls switching of an output port of the second mixer 442 to a G port of the fourth switch 432 so that a signal output from the second mixer 442 may be connected to the input port of the PA 421. Finally, the mode controller 472 connects the output port of the PA 421 to the A port of the first switch 414 so that the output port of the PA 421 may be connected to the input port of the first BPF 412.

Figure 8:
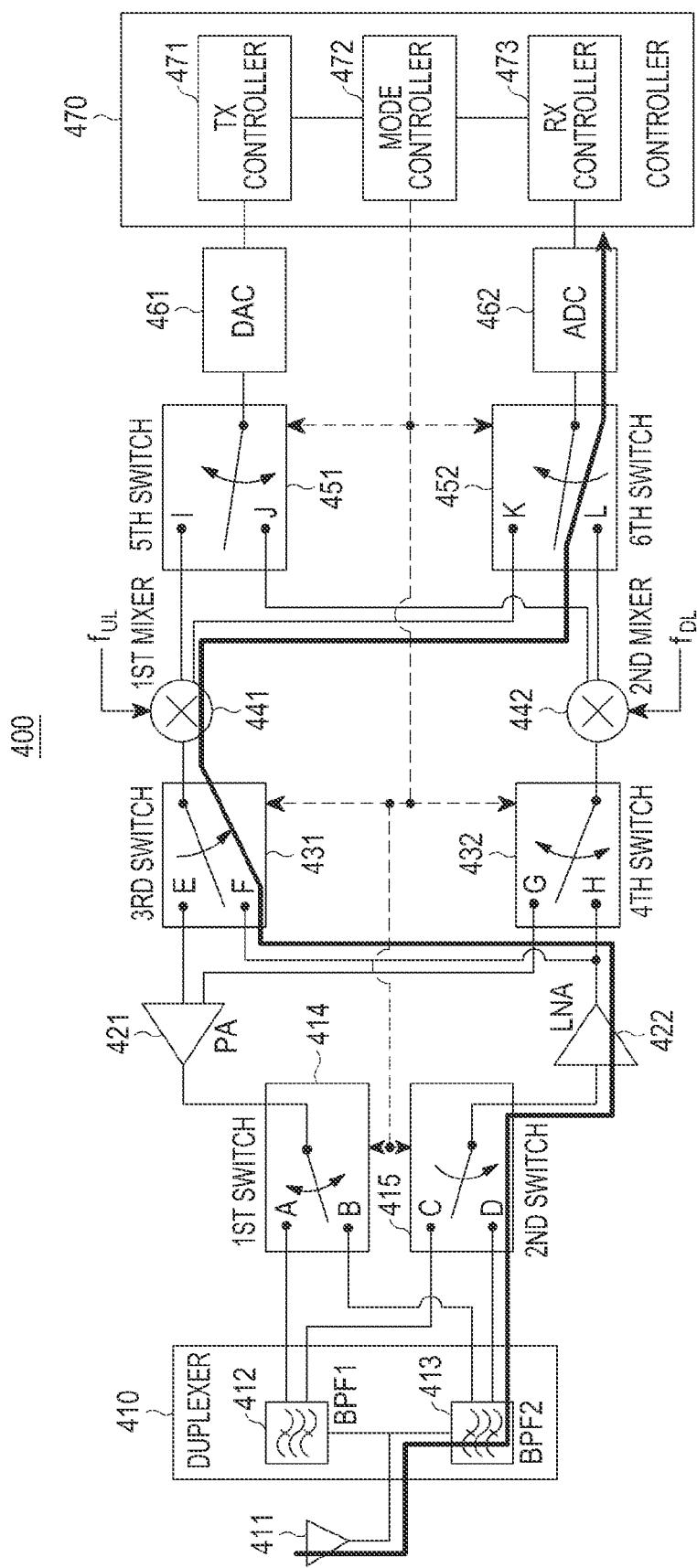
FIG. 8 illustrates an example of a signal path in a case where a UE receives a D2D communication signal based on the frame structures illustrated in FIGS. 5A, 5B, and 5C according to an embodiment of the present disclosure.

FIG. 8 illustrates a signal path in a case where a UE receives a D2D communication signal based on the frame structures illustrated in FIGS. 5A, 5B, and 5C according to an embodiment of the present disclosure. In the illustrated case of FIG. 8, resources of a UL frequency band for mobile communication are allocated as a frequency area for D2D communication.

Referring to FIG. 8, upon detecting a generation of a D2D communication signal to be received from another D2D UE in the UE 400, the mode controller 472 controls the switching unit so as to establish an Rx path of the D2D communication signal in the UL frequency band for mobile communication overlapped with/orthogonal to a D2D frequency band for D2D communication.

The first mixer 441 mixes the D2D communication signal with the UL frequency band overlapped with/orthogonal to the D2D frequency area. The second mixer 442 mixes a mobile communication signal with the DL frequency band. Accordingly, the mode controller 472 controls the switching unit so that the D2D communication signal may be received from the antenna 411 in the path where the D2D communication signal is mixed with the UL frequency band overlapped with/orthogonal to the D2D frequency area by the first mixer 441.

Specifically, the mode controller 472 controls switching of an output port of the second BPF 413 to a D port of the second switch 415 so that a signal output from the second BPF 413 may be connected to an input port of the LNA 422. Then the mode controller 472 controls switching of an output port of the LNA 422 to an F port of the third switch 431 so that a signal output from the LNA 422 may be connected to an input port of the first mixer 441. Finally, the mode controller 472 connects an output port of the first mixer 441 to a K port of the sixth switch 452 so that a signal output from the first mixer 441 may be connected to an input port of the ADC 462.

Figure 9:
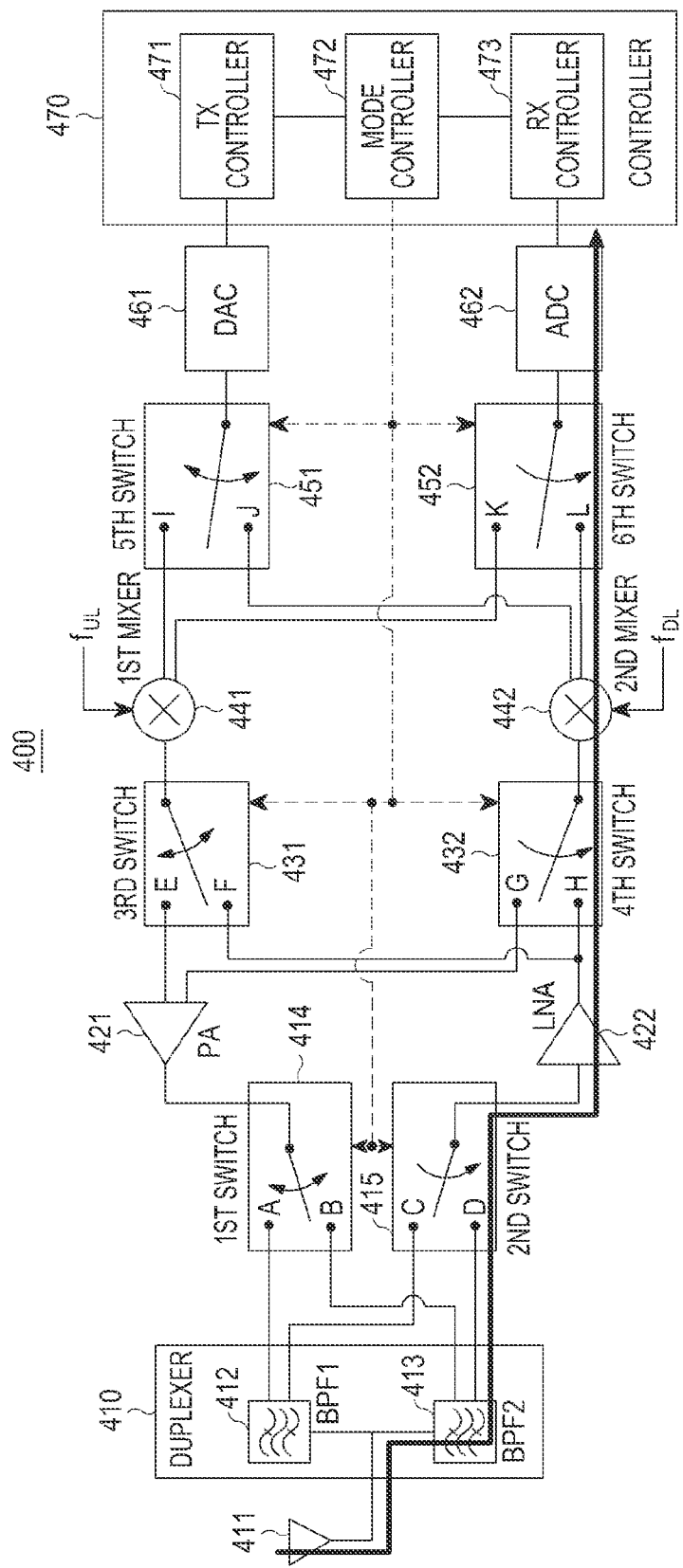
FIG. 9 illustrates an example of a signal path in a case where a UE receives a D2D communication signal based on the frame structures illustrated in FIGS. 5A, 5B, and 5C according to an embodiment of the present disclosure.

FIG. 9 illustrates a signal path in a case where a UE receives a D2D communication signal based on the frame structures illustrated in FIGS. 5A, 5B, and 5C according to an embodiment of the present disclosure. In the illustrated case of FIG. 9, resources of a DL frequency band for mobile communication are allocated as a frequency area for D2D communication.

Referring to FIG. 9, upon detecting a generation of a D2D communication signal to be received from another D2D UE in the UE 400, the mode controller 472 controls the switching unit so as to establish an Rx path of the D2D communication signal in the DL frequency band for mobile communication overlapped with/orthogonal to a D2D frequency band for D2D communication.

The second mixer 442 mixes the D2D communication signal with the DL frequency band overlapped with/orthogonal to the D2D frequency area. The first mixer 441 mixes a mobile communication signal with the UL frequency band. Accordingly, the mode controller 472 controls the switching unit so that the D2D communication signal may be received from the antenna 411 in the path where the D2D communication signal is mixed with the DL frequency band overlapped with/orthogonal to the D2D frequency area by the second mixer 442.

Specifically, the mode controller 472 controls switching of the output port of the second BPF 413 to the D port of the second switch 415 so that a signal output from the second BPF 413 may be connected to the input port of the LNA 422. Then the mode controller 472 controls switching of the output port of the LNA 422 to an H port of the fourth switch 432 so that a signal output from the LNA 422 may be connected to the input port of the second mixer 442. Finally, the mode controller 472 connects the output port of the second mixer 442 to an L port of the sixth switch 452 so that a signal output from the second mixer 442 may be connected to the input port of the ADC 462.

When the UE 400 receives a DL signal for mobile communication from an eNB, the above Rx path of a D2D communication signal may be established.

Another embodiment of the present disclosure provides a UE configured to conduct D2D communication, when resources of a UL frequency band are allocated for D2D communication.

Figure 10:
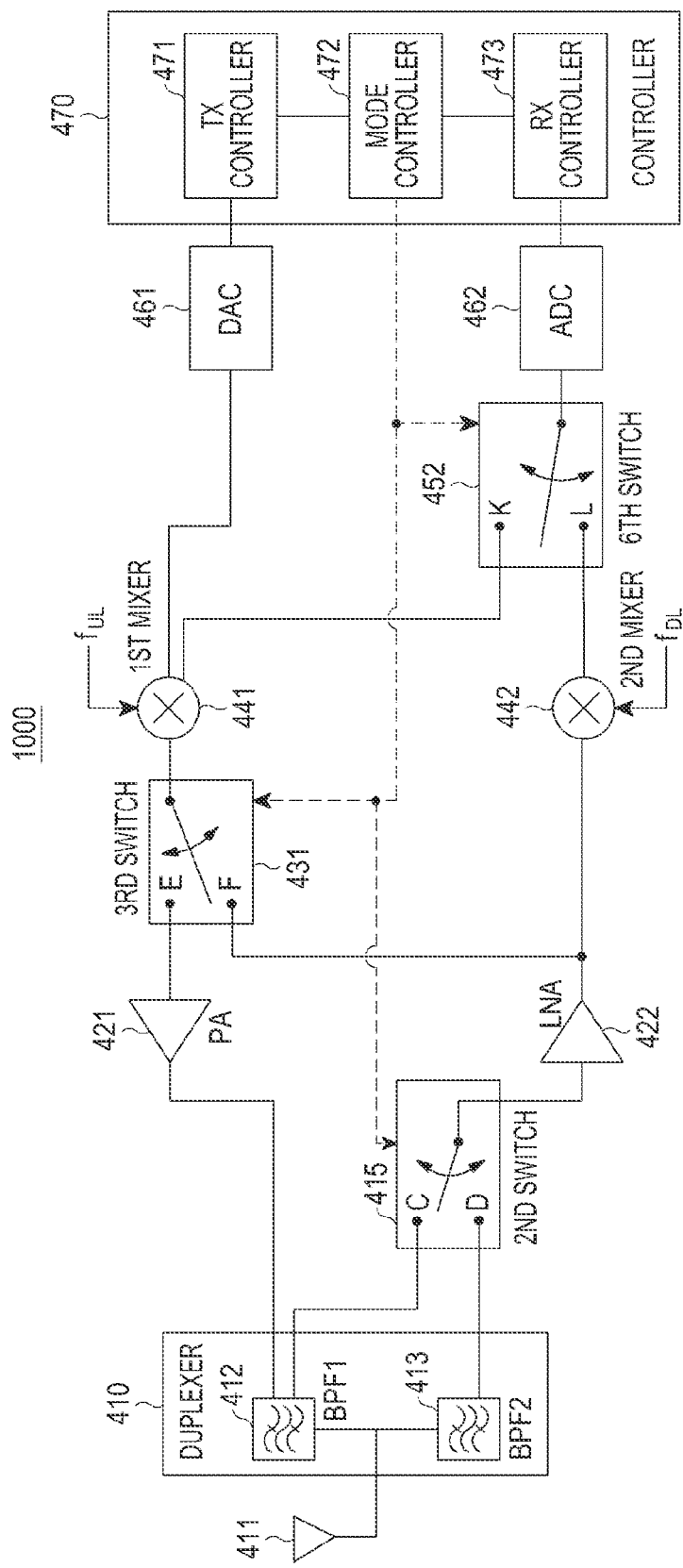
FIG. 10 illustrates an example of a structure of a UE performing D2D communication, in a case where resources of a UL frequency band are allocated for D2D communication according to another embodiment of the present disclosure.

FIG. 10 illustrates a structure of a UE performing D2D communication, in a case where resources of a UL frequency band are allocated for D2D communication according to another embodiment of the present disclosure. In the illustrated case of FIG. 10, the UE operates based on the frame structures of FIGS. 5A, 5B, and 5C.

Referring to FIG. 10, a UE 1000 includes only the second, third, and sixth switches 415, 431, and 452 among the plurality of switches included in the UE 400. The configurations of the other components of the UE 1000 are identical to those of their counterparts of the UE 400 and thus will not be described herein.

Upon detecting a generation of a D2D communication signal to be transmitted to or received from another D2D UE, the mode controller 472 of the UE 1000 controls the switches 415, 431, and 452 so as to establish a Tx or Rx path of the D2D communication signal in a path where the D2D communication signal is mixed with a UL frequency band for mobile communication overlapped with/orthogonal to a D2D frequency band.

In regards to the Tx path of a D2D communication signal, the mode controller 472 controls switching of an E port the third switch 431 to the first mixer 441 so that the output port of the first mixer 441 may be connected to the input port of the PA 421. Therefore, the Tx path of a D2D communication signal runs to the antenna 411 through the DAC 461, the first mixer 441, the PA 421, and the first BPF 412.

If the UE 1000 transmits a UL signal for mobile communication to an eNB, the UL signal is transmitted in the Tx path of D2D communication, which will not be described herein to avoid redundancy.

Upon detecting a generation of a D2D communication signal to be received from another D2D UE in the UE 1000, the mode controller 472 controls the switches 415, 431, and 452 so as to establish an Rx path of the D2D communication signal in a similar manner to as in FIG. 8, which will not be described herein in detail.

Upon receipt of a DL signal for mobile communication from the eNB in the UE 1000, the mode controller 472 controls the second and sixth switches 415 and 452 to establish an Rx path of the DL signal for mobile communication. The operation for controlling the second and sixth switches 415 and 452 in the mode controller 472 is similar to the operation illustrated in FIG. 9 except for the fourth switch and thus will not be described in detail. Thus, the Rx path of a DL signal for mobile communication may be the Rx path of a D2D communication signal illustrated in FIG. 9.

A third embodiment of the present disclosure provides a structure of a UE configured to conduct D2D communication, when resources of a DL frequency band are allocated for D2D communication.

Figure 11:
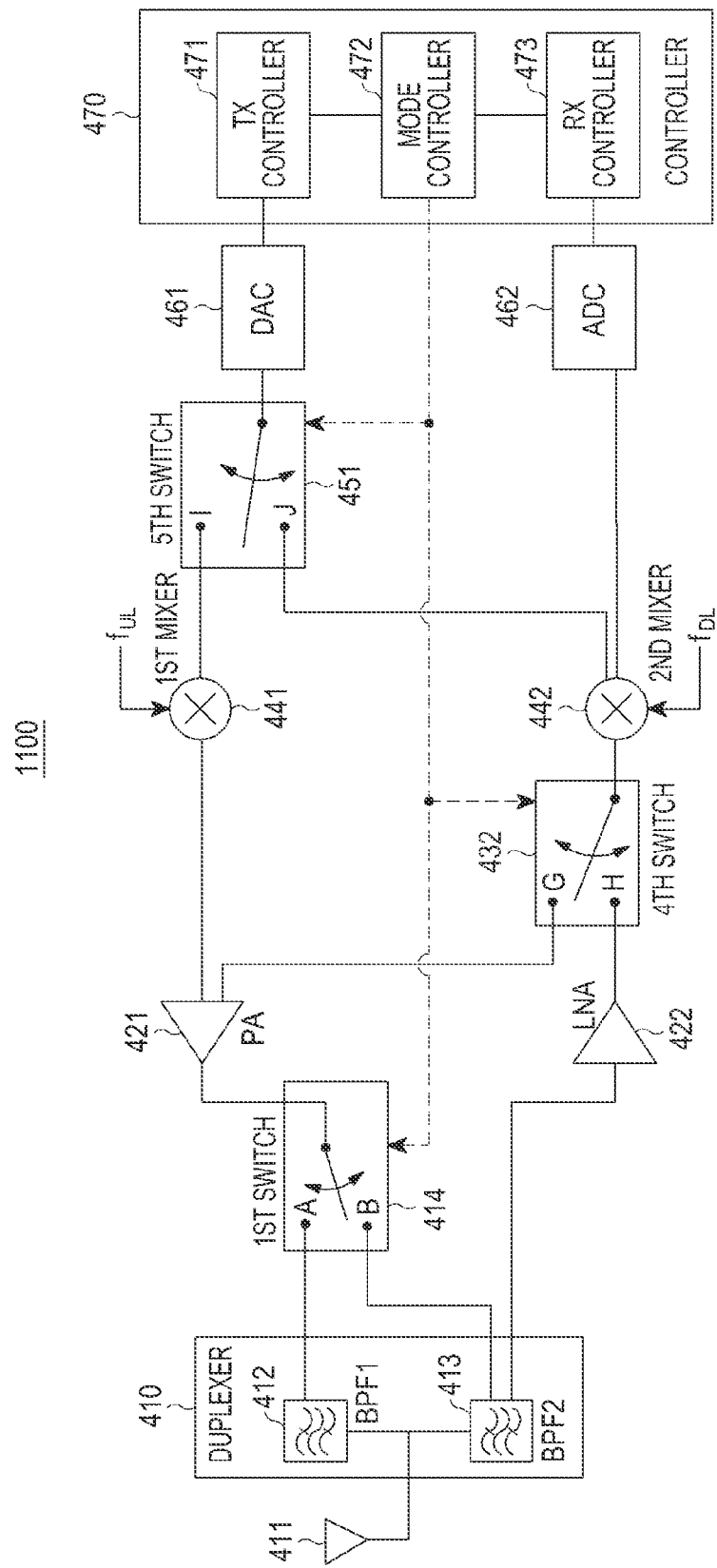
FIG. 11 illustrates an example of a structure of a UE performing D2D communication, in a case where resources of a DL frequency band are allocated for D2D communication according to another embodiment of the present disclosure.

FIG. 11 illustrates a structure of a UE performing D2D communication, in a case where resources of a DL frequency band are allocated for D2D communication according to a third embodiment of the present disclosure. In the illustrated case of FIG. 11, the UE operates based on the frame structures of FIGS. 5A, 5B, and 5C.

Referring to FIG. 11, a UE 1100 includes only the first, fourth, and fifth switches 414, 432, and 451 among the plurality of switches included in the UE 400. The configurations of the other components of the UE 1100 are identical to those of their counterparts of the UE 400 and thus will not be described herein.

Upon detecting a generation of a D2D communication signal to be received from another D2D UE, the mode controller 472 of the UE 1100 controls the switches 414, 432, and 451 so as to establish an Rx path of the D2D communication signal along a path where the D2D communicational is mixed with a DL frequency band for mobile communication overlapped with/orthogonal to a D2D frequency band.

In regards to the Rx path of a D2D communication signal, the mode controller 472 controls switching the H port of the fourth switch 432 to the LNA 422 so that the output port of the LNA 422 may be connected to the input port of the second mixer 442. Therefore, the Rx path of a D2D communication signal runs from the antenna 411 through the second BPF 413, the LNA 422, and the second mixer 442, and the ADC 462.

If the UE receives a DL signal for mobile communication from an eNB, the DL signal is received in the same path as the Rx path of a D2D communication signal, which will not be described herein to avoid redundancy.

Upon detecting a generation of a D2D communication signal to be transmitted to another D2D UE in the UE 1100, the mode controller 472 controls the switches 414, 432, and 451 so as to establish a Tx path of the D2D communication signal in a similar manner to as in FIG. 7, which will not be described herein in detail.

If the UE 1100 transmits a UL signal for mobile communication to the eNB, the mode controller 472 controls the first and fifth switches 414 and 451 to establish a Tx path of the UL signal for mobile communication. The operation for controlling the first and fifth switches 414 and 451 in the mode controller 472 is similar to the operation illustrated in FIG. 6 except for the third switch 431 and thus will not be described herein in detail. The Tx path of a UL signal for mobile communication may be the Tx path of a D2D communication signal illustrated in FIG. 6.

The proposed structure of a mobile terminal operating in a mobile communication system supporting D2D communication and the proposed operation method therefor may be implemented as computer-readable code in a non-transitory computer-readable recording medium. The non-transitory computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like. In addition, the non-transitory computer-readable recording medium may be distributed over the computer systems connected over the network, and computer-readable codes may be stored and executed in a distributed manner.

As is apparent from the foregoing description, since a UE supporting D2D communication includes a minimum number of RF chains, the implementation complexity of the UE is reduced. In addition, the UE includes switches for switching paths between the components of RF chains. Therefore, the UE can be implemented with fewer RF chains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal supporting device to device (D2D) communication in a mobile communication system, the mobile terminal comprising:
    a duplexer connected to an antenna unit;
    a first radio frequency (RF) chain comprising a digital-to-analog converter, a first mixer, and a power amplifier;
    a second RF chain comprising an analog-to-digital converter, a second mixer, and a low noise amplifier;
    a first switch configured to connect the first mixer with the power amplifier or the low noise amplifier;
    a second switch configured to connect the low noise amplifier with a first band pass filter of the duplexer or a second band pass filter of the duplexer;
    a third switch configured to connect the analog-to-digital converter with the first mixer or the second mixer; and
    a controller configured to control switching a plurality of the first switch, the second switch, and the third switch based on a D2D communication mode or a mobile communication mode.

2. The mobile terminal of claim 1,
    wherein the first switch connects the first mixer to the power amplifier if the mobile terminal transmits a signal for D2D communication or mobile communication.

3. The mobile terminal of claim 1,
    wherein, if the mobile terminal receives a signal for D2D communication, the first switch connects the first mixer to the low noise amplifier, the second switch connects the low noise amplifier to the first band pass filter of the duplexer, and the third switch connects the first mixer to the analog-to-digital converter.

4. The mobile terminal of claim 1,
    wherein, if the mobile terminal receives a signal for mobile communication, the second switch connects the low noise amplifier to the second band pass filter of the duplexer, and the third switch connects the second mixer to the analog-to-digital converter.

5. A device to device (D2D) communication method of a mobile terminal in a mobile communication system supporting D2D communication,
    wherein the mobile terminal comprising a duplexer connected to an antenna unit, a first radio frequency (RF) chain comprising a digital-to-analog converter, a first mixer, and a power amplifier, a second RF chain comprising an analog-to-digital converter, a second mixer, and a low noise amplifier, a first switch configured to connect the first mixer with the power amplifier or the low noise amplifier, a second switch configured to connect the low noise amplifier with a first band pass filter of the duplexer or a second band pass filter of the duplexer, a third switch configured to connect the analog-to-digital converter with the first mixer or the second mixer, and a controller configured to control switching of the first switch, the second switch, and the third switch based on a D2D communication mode or a mobile communication mode,
    the method comprising:
        determining, by the controller, to receive a signal for D2D communication;

controlling, by the controller, the first switch to connect the first mixer to the low noise amplifier;
controlling, by the controller, the second switch to connect the low noise amplifier to the first band pass filter of the duplexer; and
controlling, by the controller, the third switch to connect the first mixer to the analog-to-digital converter.

6. The method of claim 5, further comprising:
determining, by the controller, to transmit a signal for D2D communication or mobile communication; and
switching, by the controller, the first switch to connect the first mixer to the power amplifier.

7. The method of claim 5, further comprising:
determining, by the controller, to receive a signal for mobile communication;
switching, by the controller, the second switch to connect the low noise amplifier to the second band pass filter of the duplexer; and
switching, by the controller, the third switch to connect the second mixer to the analog-to-digital converter.

* * * * *